United States Patent Office 3,654,282
Patented Apr. 4, 1972

3,654,282
**1,2,3,4-TETRAHYDRO-ISOQUINOLINE
1-CARBOXYLIC ACIDS**
Jean-Pierre Fourneau and Jean Delourme, Paris, France, assignors to Laboratoires Houde, Paris, France
No Drawing. Filed Aug. 21, 1969, Ser. No. 852,081
Claims priority, application France, Mar. 9, 1970, 164,817
Int. Cl. C07d 35/10
U.S. Cl. 260—287    2 Claims

ABSTRACT OF THE DISCLOSURE

New tetrahydroisoquinoline derivatives having in particular anti-tussive activity, consisting of compounds of formula

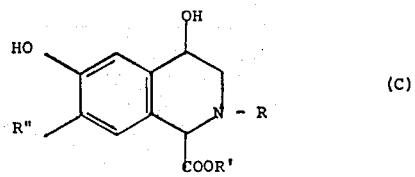

in which R and R', which may be the same or different, represent hydrogen or a lower alkyl group of 1–8 carbon atoms and R" is hydrogen or hydroxy group, or a mutual salt of the cis and trans forms of this compound when R'=H.

---

This invention relates to new tetrahydroisoquinoline derivatives having useful pharmacological properties.

The new products of the invention consist of reaction products of a compound of formula:

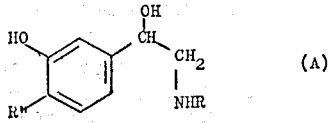

with a compound of formula:

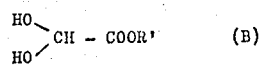

in which formulae R and R', which may be the same or different, represent hydrogen or a lower alkyl group of 1–8 carbon atoms and R" is hydrogen or a hydroxy group.

The new tetrahydroisoquinoline derivatives of the invention are compounds of formula:

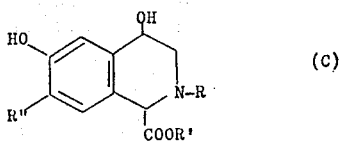

in which R, R' and R" are as defined above, or the mutual salts of the cis and trans forms of these compounds when R'=H.

The compounds defined above exhibit, to varying degrees, an anti-tussive activity useful in human therapeutics and a very low toxicity.

The process for the preparation of the tetrahydroisoquinoline derivatives, comprises reacting one mole of a compound of Formula A with one mole of a compound of Formula B, wherein R, R' and R" have the above defining meanings, and collecting the resulting reaction product.

The reaction between compound (A) and glyoxylic acid or its ester of Formula B is generally carried out at room temperature, the glyoxylic acid or its ester being added in equimolecular amount, in aqueous or alcoholic solution (sometimes slightly acidified when a glyoxylic acid ester is used), to the arylethanolamine (A).

Dissolution is made complete by stirring; heat is generally evolved, which is limited by cooling under a stream of water; a slight discoloration of the solution takes place. The reaction product crystallizes spontaneously; it is then suction filtered and recrystallized from water or an organic solvent, according to the case. The esters of Formula C may also be prepared by esterification of acids of Formula C with the corresponding alcohols R'OH, in the presence of anhydrous hydrochloric acid.

The following non-limiting examples are given to illustrate the invention.

EXAMPLE 1

(1) Mutual salt of cis and trans-4,6-dihydroxy-2-methyl-1,2,3,4-tetrahydro-isoquinoline 1-carboxylic acids (I) (R=CH$_3$; R'=R"=H)

To a conical flask containing 16.76 g. (0.1 mole) of powdered phenylephrine base is added an aqueous solution of 9.2 g. (0.1 mole) of glyoxylic acid monohydrate. The mixture is stirred until completely dissolved; heat is evolved. Crystallization is promoted by scratching, the reaction is cooled under a stream of water and crystallization is completed in the refrigerator. The crystalline material is suction filtered, washed with cold water (2×20 ml.), and then with alcohol and with ether and is then dried in air to constant weight, to give 16.5 g. (yield: 73%) of pure product melting at 230–235° C. with decomposition.

*Analysis.*—Calcd. for C$_{11}$H$_{13}$NO$_4$ (percent): C, 59.19; H, 5.87; N, 6.27. Found (percent): C, 59.21; H, 5.78; N, 6.45.

(2) Cis - 4,6 - dihydroxy-2-methyl-1,2,3,4-tetrahydro-isoquinoline 1-carboxylic acid (Ia) (Formula C)

(a) 0.076 mole of the methyl ester of 4,6-dihydroxy-2-methyl-1,2,3,4-tetrahydro-isoquinoline 1-carboxylic acid, prepared as in Example 4 hereinunder, is heated with 45 ml. of 2 N sodium hydroxide under refluxing conditions; the precipitate is suction filtered and is then suspended in a few ml. of water; the pH is brought to 5–6 with 6 N NCl; the material is again suction filtered; it is then washed twice with 15 ml. of cooled water, and then with alcohol and with ether. The product is obtained with a yield of 57%, M.P.=225° C. with dec. Concentrating the mother-liquors to dryness and taking up the crystalline residue into 18 ml. of boiling water makes it possible to collect 1 g. of product, which brings the yield up to 63%.

(b) The product may also be obtained by methylation of the N-unsubstituted acid (see Example 2). 55 g. (0.06 mole) of product of Example 2, 13.8 g. (0.3 mole) of formic acid and 18 g. (0.18 mole) of 30% formalin are refluxed, using a water-bath, during 8 hours. The mixture is taken up into water and neutralized, which causes crystallization of a material entirely identical with that described above under (a).

(3) Trans-4,6-dihydroxy-2-methyl-1,2,3,4-tetrahydro-isoquinoline 1-carboxylic acid (Ib) (Formula C)

Glyoxylic acid monohydrate (0.036 mole) is dissolved in 112 ml. of dimethylsulfoxide; phenylephrine base (0.036 mole) is added thereto, with stirring; the temperature rises then to about 45° C. and complete dissolution is obtained, followed by precipitation. Stirring is continued for a further 4 hours, the precipitate is suction filtered through sintered glass and is then washed with dimethylsulfoxide (20 ml.) and then with alcohol and with ether. There are recovered 45 g. of compound (I) with a yield of 56%. When 400 ml. of absolute ethanol and 200 ml. of ether are added to the combined filtrates, a gummy mass which crystallizes is produced. This is suction filtered and then washed with alcohol and with ether; thus is isolated trans isomer (Ib) with a yield of 27.8% (22.3 g.), M.P. 224–225° C. (dec.). When equal parts of (Ia) and (Ib) are dissolved in boiling water, product (I) crystallizes on cooling.

EXAMPLE 2

Mutual salt of cis and trans-4,6-dihydroxyl-1,2,3,4-tetrahydroisoquinoline 1-carboxylic acids (II) (R'=R''=H)

The procedure of Example 1 (1), is used, substituting 0.1 mole of phenylephrine with 0.1 mole of norphenylephrine. Yield: 87.4%; M.P.=238° C.

Analysis.—Calcd. for $C_{10}H_{11}NO_4$ (percent): C, 57.42; H, 5.30; N, 6.69. Found (percent): C, 57.53; H, 5.02; N, 6.68.

EXAMPLE 3

Mutual salt of cis and trans-4,6-dihydroxy-2-ethyl-1,2,3,4-tetrahyisoquinoline 1-carboxylic acids (III) (R=$C_2H_5$; R'=R''=H)

The procedure of Example 1 (1), is used, substituting 0.1 mole of phenylephrine with 0.1 mole of N-ethyl-norphenylephrine and substituting the water with ethanol to dissolve the glyoxylic acid. Yield: 80%; M.P. 212° C.

Analysis.—Calcd. for $C_{12}H_{15}NO_4$ (percent): C, 60.75; H, 6.37; N, 5.90. Found (percent): C, 60.30; H, 6.61; N, 5.75.

EXAMPLE 4

Methyl 4,6 - dihydroxy - 2-methyl-1,2,3,4-tetrahydro-isoquinoline carboxylate (IV) (R=$CH_3$; R'=$CH_3$; R''=H)

(a) Direct condensation from methyl glyoxylate.—Phenylephrine (5 g.; 0.025 mole) is heated in 10 ml. of methanol; methyl glyoxylate (2.15 g.; 0.025 mole) is cautiously added to the hot solution; if required, the pH is acidified to a value of 2, with hydrocloric acid; the contacting is allowed to continue at least during 2 days; the solution is concentrated in vacuo, over a water-bath, the solvent is completely removed, the viscous residue is dissolved in the minimum amount of water (made alkaline to pH 8–9 with ammonia), to give a precipitate which is suction filtered, washed with water and dried. M.P. 159–160°; weight: 2.35 g. (yield: 40%).

(b) Esterification of the corresponding acid.—40 g. of compound (I) of Example 1 dissolved in methanol (400 ml.) containing dry hydrochloric acid (40 g.) are refluxed during 2 hours; the solution is concentrated to dryness in vacuo, over the water-bath, the residue is taken up into a mixture of methanol and benzene; it is then again concentrated to dryness, and the procedure is repeated a number of times to dry the material completely. The residue is taken up into 400 ml. of methanol containing 40 g. of dry hydrochloric acid and is then refluxed during 2 hours. These operations are repeated three times, final evaporation to dryness is then carried out and the residue is finally dissolved in water (60 ml.) containing ammonia (200 ml.) at 20° Bé. Crystallization occurs spontaneously; the crystalline product is suction filtered, washed with water and dried.

1st crop: M.P. 159–160° C., weight: 18.59 g.
2nd crop (which separates from the filtrate): M.P. 158–160° C., weight: 14.91 g.
Total weight: 33.5 g., i.e., a yield of 75.5%.

The products obtained under (a) and (b) are identical.

Analysis.—Cald. for $C_{12}H_{15}NO_4$ (percent): C, 60.76; H, 6.33; N, 6.91. Found (percent): C, 60.43; H, 6.39; N, 6.01.

EXAMPLE 5

Ethyl 4,6 - dihydroxy - 2 - methyl - 1,2,3,4 - tetrahydro-isoquinoline carboxylate (V) (R=$CH_3$; R'=$C_2H_5$; R''=H) (Formula C)

(a) Direct condensation from ethyl glyoxylate.—The procedure of Example 4(a) is used, substituting 0.025 mole of methyl glyoxylate with 0.025 mole of ethyl glyoxylate. M.P.=159–160°; recrystallized from water, M.P. 168°, yield: 40%.

(b) Esterification.—The procedure of Example 4(b) is used, substituting the methanolic hydrochloric acid solution with ethanol (400 ml.) containing dry hydrochloric acid (40 g.). The material is suction filtered, washed with water and dried to give the ethyl ester with a yield of 65%, M.P.=170° C.

Analysis.—Cald. for $C_{13}H_{17}NO_4$ (percent): C, 62.14; H, 6.82; N, 5.57. Found (percent): C, 62.35; H, 7.04; N, 5.62.

Products (a) and (b) are identical.

EXAMPLE 6

Propyl 4,6 - dihydroxy - 2 - methyl - 1,2,3,4 - tetrahydro-isoquinoline carboxylate (VI) (R=$CH_3$; R'=$C_3H_7$; R''=H) (Formula C)

(a) Direct condensation from propyl glyoxylate.—The procedure of Example 4(a) is used, substituting the methyl glyoxylate with 0.025 mole of propyl glyoxylate. This gives a product melting at 157° C. after recrystallization from acetone and, from a 2nd crop, the mixture of cis (VIa) and trans (VIb) is obtained (yield: 20%; M.P. 140°).

(b) Esterification.—The procedure of Example 4(b) is used, substituting the methanolic hydrochloric acid solution with propanol (400 ml.) containing dry hydrochloric acid (40 g.); this gives a product which, on recrystallization from acetone, melts at 157° C. Yield: 97%.

Analysis.—Cald. for $C_{14}H_{19}NO_4$ (percent): C, 63.38; H, 7.22; N, 5.28. Found (percent): C, 63.62; H, 7.22; N, 5.44.

EXAMPLE 7

Isopropyl 4,6 - dihydroxy - 2 - methyl - 1,2,3,4 - tetrahydro - isoquinoline carboxylate (VII) (R=$CH_3$; R'=iso.$C_3H_7$; R''=H) (Formula C)

(a) Condensation from isopropyl glyoxylate.—The procedure of Example 4(a) is used, substituting 0.025 mole of methyl glyoxylate with 0.025 mole of isopropyl glyoxylate. Recrystallization is carried out from methanol. There are obtained a 1st crop, M.P. 170° C. (yield: 31%), followed by a 2nd crop, M.P. 165° C. (yield: 16%), containing both the cis and trans isomers.

(b) Esterification.—The procedure of Example 4(b) is used, substituting the methanolic hydrochloric acid solution with isopropanol (400 ml.) containing dry hydrochloric acid (40 g.). A product melting at 168–170° C. is obtained. Yield: 50%.

Analysis.—Cald. for $C_{14}H_{19}NO_4$ (percent): C, 63.38; H, 7.22; N, 5.28. Found (percent): C, 63.32; H, 7.43; N, 5.30.

EXAMPLE 8

Butyl 4,6 - dihydroxy - 2 - methyl - 1,2,3,4 - tetrahydro-isoquinoline carboxylate (VIII) (R=$CH_3$; R'=$C_4H_9$; R''=H) (Formula C)

(a) Condensation from butyl glyoxylate.—The procedure of Example 4(a) is used, substituting 0.025 mole of methyl glyoxylate with 0.025 mole of butyl glyoxylate. A first crop (yield: 29%) is obtained which, on recrystallization from methanol, melts at 143–145° C., followed by a 2nd crop containing both the cis and trans isomers, with a yield of 12%, M.P. about 128° C.

(b) Esterification.—The procedure of Example 4(b) is used, substituting the methanolic hydrochloric acid solution with butanol (400 ml.) containing dry hydrochloric acid (40 g.). A product melting at 143–5° C. is obtained.

Analysis.—Cald. for $C_{15}H_{21}NO_4$ (percent): C, 64.49; H, 7.58; N, 5.01. Found (percent): C, 64.59; H, 7.57; N, 5.20.

EXAMPLE 9

Isobutyl 4,6-dihydroxy-2-methyl-1,2,3,4-tetrahydro-isoquinoline carboxylate (IX) (R=$CH_3$; R'=iso.$C_4H_9$; R''=H) (Formula C)

(a) Condensation from isobutyl glyoxylate.—The procedure of Example 4(a) is used, substituting the methyl glyoxylate with 0.025 mole of isobutyl glyoxylate. A first crop (yield 40%), M.P. 166–168° C. is obtained, and then a second crop, M.P. about 150° C. (yield: 10%) which is the mixture of the cis and trans isomers.

(b) Esterification.—The procedure of Example 4(b) is used, substituting the methanolic hydrochloric acid solution with isobutanol (400 ml.) containing dry hydrochloric acid (40 g.). A product melting at 165° C. is obtained. Yield: 82%.

Analysis.—Cald. for $C_{15}H_{21}NO_4$ (percent): C, 64.49; H, 7.58; N, 5.01. Found (percent): C, 64.20; H, 7.78; N, 5.06.

EXAMPLE 10

Amyl 4,6-dihydroxy-2-methyl-1,2,3,4-tetrahydro-isoquinoline carboxylate (X) (R=$CH_3$; R'=$C_5H_{11}$; R''=H) (Formula C)

(a) Condensation from amyl glyoxylate.—The procedure of Example 4(a) is used, substituting the methyl glyoxylate with 0.025 mole of amyl glyoxylate. A product melting at 130° C. after recrystallization from aqeuous methanol is obtained (yield: 27%).

(b) Esterification.—The procedure of Example 4(a) is used, substituting the methanolic hydrochloric acid solution with amyl alcohol (400 ml.) containing dry hydrochloric acid (40 g.). This gives, with a yield of 26.5%, a product which melts at 130° C. on recrystallization from aqueous methanol.

Analysis.—Cald. for $C_{16}H_{23}NO_4$ (percent): C, 65.51; H, 7.90; N, 4.28. Found (percent): C, 65.69; H, 8.04; N, 4.88.

EXAMPLE 11

Isoamyl 4,6-dihydroxy-2-methyl-1,2,3,4-tetrahydro-isoquinoline carboxylate (XI) (R=$CH_3$; R'=iso.$C_5H_{11}$; R''=H) (Formula C)

(a) Condensation from isoamyl glyoxylate.—The procedure of Example 4(a) is used, substituting the methyl glyoxylate with 0.025 mole of isoamyl glyoxylate. Yield: 40%; M.P. 153–155° C.; the product may be recrystallized from aqueous methanol.

(b) Esterification.—The procedure of Example 4(b) is used, substituting the methanolic hydrochloric acid solution with isoamyl alcohol (400 ml.) containing dry hydrochloric acid (40 g.). A product which, on recrystallization from aqueous methanol, melts at 153–155° (yield 19%) is thereby obtained.

Analysis.—Calcd. for $C_{16}H_{23}NO_4$ (percent): C, 65.51; H, 7.90; N, 4.78. Found (percent): C, 65.38; H, 7.94; N, 4.82.

EXAMPLE 12

Methyl 4,6-dihydroxy-1,2,3,4-tetrahydro-isoquinoline carboxylate (XII) (R=H; R'=$CH_3$; R''=H) Formula C)

The procedure of Example 4(b) is used, substituting the 40 g. of compound (I) with 40 g. of compound (II) of Example 2; on recrystallization from aqueous methanol, a product melting at 180° C. (with decomposition) is obtained yield: 65%.

Analysis.—Calcd. for $C_{11}H_{13}NO_4$ (percent): C, 59.18; H, 5.87. Found (percent): C, 59.11; H, 5.68.

EXAMPLE 13

Ethyl 4,6-dihydroxy-1,2,3,4-tetrahydro-isoquinoline carboxylate (XIII) (R=H; R'=$C_2H_5$; R''=H) (Formula C)

The procedure of Example 5(b) is used, substituting compound (I) with compound (II); recrystallization from methanol gives a first crop which is a mixture of both cis and trans isomers, melting at 180–190° C. (yield: 66.4%) and a second crop melting at 194–195° corresponding to one of the isomers in pure form.

Analysis.—Calcd. for $C_{12}H_{15}NO_4$ (percent): C, 60.75; H, 6.37; N, 5.90. Found (percent): C, 60.69; H, 6.48; N, 6.05.

EXAMPLE 14

Propyl 4,6-dihydroxy-1,2,3,4-isoquinoline carboxylate (XIV) (R=H; R'=$C_3H_7$; R''=H) (Formula C)

The procedure of Example 6(b) is used, substituting compound (I) with compound (II). On recrystallization from 50% aqueous methanol, the product melts at 165–166° (yield=52%).

Analysis.—Calcd. for $C_{13}H_{17}NO_4$ (percent): C, 62.14; H, 6.82; N, 5.57. Found (percent): C, 61.97; H, 6.75; N, 5.58.

EXAMPLE 15

Isobutyl 4,6-dihydroxy-1,2,3,4-tetrahydro-isoquinoline carboxylate (XV) (R=H; R'=iso.$C_4H_9$; R''=H) (Formula C)

The procedure of Example 9(b) is used, substituting compound (I) with compound (II). On recrystallization from methylethyl ketone, the product melts at 148–149° C. yield: 14%.

Analysis.—Calcd. for $C_{14}H_{19}NO_4$ (percent): C, 63.38; H, 7.22; N, 5.28. Found (percent): C, 63.19; H, 7.23; N, 5.27.

EXAMPLE 16

Isoamyl 4,6-dihydroxy-1,2,3,4-tetrahydro-isoquinoline carboxylate (XVI) (R=H; R'=iso.$C_5H_{11}$; R''=H) (Formula C)

The procedure of Example 11(b) is used, substituting compound (I) with compound (II). The resulting product is recrystallized from methylethylketone. Yield 10%.

Analysis.—Calcd. for $C_{15}H_{21}NO_4 \cdot H_2O(\frac{3}{4})$ (percent): C, 61.52; H, 7.74; N, 4.48. Found (percent): C, 61.49; H, 7.49; N, 4.78.

EXAMPLE 17

Methyl 4,6-dihydroxy-2-ethyl-1,2,3,4-tetrahydro-isoquinoline carboxylate (XVII) (R=$C_2H_5$; R'=$CH_3$; R''=H) (Formula C)

The procedure of Example 4(b) is used, substituting the 40 g. of compound (I) with 40 g. of compound (III) of Example 3. Yield: 65%, M.P. 139–140°

Analysis.—Calcd. for $C_{13}H_{17}NO_4$ (percent): C, 62.13; H, 6.82; N, 5.57. Found (percent): C, 62.13; H, 6.91; N, 5.67.

Results of toxicological and pharmacological tests carried out with some of the products according to the invention, and particularly those of the preceding examples (the reference numbers of the products are given in said examples) will now be given for illustrative purposes.

(I) ACUTE TOXICITY

[$LD_{50}$ in mice, mg./kg.]

| Product Number: | Route of administration— | | |
|---|---|---|---|
| | Intravenous | Intraperitoneal | Per os. |
| I | >800 | >1,000 | >1,000 |
| Ia | >1,000 | >1,000 | >1,000 |
| Ib | >800 | >1,000 | >1,000 |
| II | | >600 | >1,000 |
| III | >800 | >1,000 | >1,000 |
| IV | 250 | 500 | >1,000 |
| VI | 300 | 600 | 1,000 |
| Mixture VIa plus VIb | 350 | 600 | 1,000 |
| VIII | 160 | 450 | 800 |
| IX | 180 | >1,000 | >1,000 |
| XI | 150 | >1,000 | >1,000 |
| XIII | 650 | >1,000 | >1,000 |
| XV | 420 | >600 | >1,000 |
| Codein phosphate (for comparative purposes) | 65 | 130 | |

Thus, it is apparent that the acute toxicity of all products tested is extremely low and always much lower than that of codein phosphate.

(II) SYSTEMIC EFECTS

At dosages of 2-20 mg./kg., by the intravenous route in rat, guinea-pig or rabbit, the only effects found for some of the products are a low and transient hypotension and a respiratory stimulation, also of short duration.

(III) ANTI-TUSSIVE ACTIVITY (1) Products (I), (Ia) and (III) protect markedly the guinea-pig against coughing induced by ammonia aerosols, according to the technique of C. A. Winter and L. Flataker (J. Pharmacol. exper. Therap., 1954, 112, 99).

(2) Product (I) was compared with codein phosphate in decerebrated guinea-pig, coughing being induced by touching the inner tracheal walls with a small catheter, according to M. Lemeignan, G. Streichenberger and P. Lechat (Thérapie, 21, 361).

On administration by the intra-peritoneal route, 60 mg./kg. of (I) and 10 mg./kg. of codein phosphate have a comparable activity, decreasing strongly the severity of the coughing fits during 40-60 minutes (5 mg./kg. of codein phosphate are inactive). It should be noted that (I) is free from any toxicity by the intra-peritoneal route ($LD_{50}$ above 1 g./kg.) whereas that of codein phosphate, by this route, is 130 mg./kg.

(3) Product (I) and its constituents (Ia) and (Ib), and also products (X), and (XIII) were submitted to R. Domenjoz's test (Arch. Exp. Pathol. Pharmacol., 1952, 215, 19) which comprises stimulating electrically the upper laryngeal nerve in cat while the trachea is connected through a cannula with a Marey drum which records the respiration and its variations under the influence of coughing. Codein phosphate was used as reference material.

(I) and (Ib) have an anti-tussive activity that is comparable in intensity to that of codein phosphate at the same dosages. The activity of (Ia) is markedly lower. Duration of the action of (I) is comparable to that of codein phosphate and higher than that of (Ia) and (Ib) administered separately.

The anti-tussive activity of (XIII) is close to that of (I) both with respect to intensity and to duration, and that of (X) is close, as to intensity, but lower as to duration.

(IV) ACTION ON INTESTINAL TRANSIT

Product (I) has no action on intestinal transit in mice, whereas codein phosphate slows it down strongly: after administration of a charcoal slurry to three lots of 10 mice, the average percentages of the length of intestine travelled by the charcoal are the following:

|  | Percent |
|---|---|
| Reference animals | 59.7 |
| Treated with 75 mg./kg. codein phosphate per os | 13.2 |
| Treated with 150 mg./kg. of product (I) per os | 60.7 |

(V) To conclude, the products according to the invention, and more particularly product (I), mutual salt of cis- and trans-4,6-dihydroxy-1,2,3,4-tetrahydro-isoquinaldic acids, are endowed with anti-tussive properties equivalent to those of codein, with the following advantages over the latter: acute toxicity practically nil, absence of paralysing action on the intestine and absence of respiratory depressant action.

They are applicable in human therapeutics for the treatment of coughing from any origin: tracheitis, rhinopharyngitis, laryngitis, bronchitis, acute and chronic pneumonopathy, influenza, spasmodic and reflex coughing, coughing, fits, whooping-cough, tuberculosis.

They are administrable in the form of a therapeutic composition containing, as active ingredient, a derivative of Formula C together with a pharmaceutically acceptable vehicle.

This composition is administrable by the oral or rectal route, for example at a daily dosage regimen of 0.05-1 g., or more, of active principle, according to the case.

For administration, the composition is formulated in particular as tablets, coated tablets, or capsules, containing for example 25-250 mg. of active ingredient per unit dose, or as sweetened and flavored granules or suspensions containing 0.5-5%, by weight, of active ingredient, or also in the form of suppositories containing each 50-500 mg. of active ingredient.

In such pharmaceutical forms, the active ingredient is associated with the suitable well-known vehicles or excipients.

Having now described our invention what we claim as new and desire to secure by Letters Patent is:

1. A tetrahydroisoquinoline derivative selected from the compounds of formula:

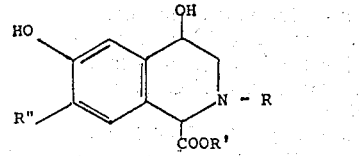

wherein each of R and R' is selected from the group consisting of hydrogen and the lower alkyl groups of 1-8 carbon atoms and R" is selected from the group consisting of hydrogen and the hydroxy group and the mutual salts of the cis and trans forms of said compounds when R' is hydrogen.

2. The mutual salt of cis- and trans-4,6-dihydroxy-2-methyl-1,2,3,4-tetrahydroisoquinoline 1-carboxylic acids.

References Cited

UNITED STATES PATENTS 3,491,107  1/1970  Allen et al. _____ 260—287

FOREIGN PATENTS 646,706  6/1937  Germany _____ 260—287

OTHER REFERENCES

Merchant et al.: Abstracted in Chem. Abstr., vol. 52, col. 5413-4 (1958).

DONALD G. DAUS, Primary Examiner

U.S. Cl. X.R.

260—287 R; 424—258